US010102515B2

(12) United States Patent
Vastenavondt et al.

(10) Patent No.: US 10,102,515 B2
(45) Date of Patent: Oct. 16, 2018

(54) METHOD AND SYSTEM FOR A UNIFIED PLATFORM AND DATA INTEGRATION IN A GROUP OF RELATED COMPANIES

(71) Applicant: MasterCard International Incorporated, Purchase, NY (US)

(72) Inventors: Joost Vastenavondt, Asse (BE); Benjamin Dessy, Ceroux (BE); Davide Messina, Rome (IT)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 570 days.

(21) Appl. No.: 14/802,456

(22) Filed: Jul. 17, 2015

(65) Prior Publication Data

US 2016/0019545 A1  Jan. 21, 2016

Related U.S. Application Data

(60) Provisional application No. 62/026,248, filed on Jul. 18, 2014.

(51) Int. Cl.
*G06Q 20/40* (2012.01)
*G06Q 20/22* (2012.01)

(52) U.S. Cl.
CPC ................. *G06Q 20/227* (2013.01)

(58) Field of Classification Search
CPC .................................. G06Q 20/40
USPC ....................................... 705/44
See application file for complete search history.

(56) References Cited

U.S. PATENT DOCUMENTS

| | | | | |
|---|---|---|---|---|
| 7,653,577 B2 * | 1/2010 | Warner | ................. | G06Q 20/10 705/1.1 |
| 9,235,840 B2 * | 1/2016 | Syed | ................. | G06Q 20/4016 |
| 2008/0301055 A1 * | 12/2008 | Borgs | .................... | G06Q 20/02 705/64 |
| 2013/0297500 A1 * | 11/2013 | Miller | ................ | G06O 20/4016 705/40 |
| 2014/0067607 A1 * | 3/2014 | Bryan | ................ | G06O 30/0623 705/26.41 |
| 2015/0356583 A1 * | 12/2015 | Sheppard | ............... | G06Q 10/06 705/7.34 |

* cited by examiner

*Primary Examiner* — Lindsay M Maguire
(74) *Attorney, Agent, or Firm* — Buchanan Ingersoll & Rooney PC

(57) ABSTRACT

A method for data integration in a unified platform includes a processing server that is configured to store account profiles for unified transaction and membership accounts, receive authentication requests from multiple entities, receive a transaction message for a payment transaction from another entity, identify an account profile associated with the authentication requests and payment transaction, process the payment transaction, perform authentication for each of the authentication requests, and electronically transmit results of the transaction processing and authentication to the appropriate entities, such that the processing server provides for a unified platform where data is integrated and used at a plurality of different merchants for a plurality of different services for consumer and merchant convenience.

20 Claims, 6 Drawing Sheets

METHOD AND SYSTEM FOR A UNIFIED PLATFORM AND DATA INTEGRATION IN A GROUP OF RELATED COMPANIES

FIELD

The present disclosure relates to the integration of data in a unified platform, specifically the integration of user and payment data in a unified platform configured to process application and website user login and authentication and payment transactions involving the users.

BACKGROUND

In many industries, there are a drastic number of different merchants, vendors, service providers, and other entities involved with which a consumer may need to interact. For example, in the music industry, a consumer that purchases music, goes to a concert, and attends a festival may interact with a music retailer, a ticket distributor, the concert venue, a merchant at the concert venue, a second ticket distributor for the festival, the festival organizer, and multiple merchants and vendors at the festival. Each of these entities may have separate websites that may require the consumer to login to access their services, the concert and festival may have their tickets distributed to the consumer via different methods, and each of the vendors and merchants at the festival may accept different payment methods. As a result, in such industries, it may be difficult and overwhelming for a consumer to participate.

Thus, there is a need for a technical solution where services at each vertical level in an industry may be integrated in a unified platform that is also configured to process payment transactions. By providing a system configured to process authentications as well as payment transactions, a consumer experience may be enhanced by enabling a consumer to utilize a single set of authentication credentials, such as a username and password, to access websites and application programs for each merchant associated with the platform, and also use a single payment method accepted throughout the entire platform. In addition, the provision of guaranteed processing for payment transactions and acceptance of a universal payment method, offered by a unified platform, as well as access to authentication services, may be beneficial as it requires less system architecture and processing power for the merchant's application services and devices.

SUMMARY

The present disclosure provides a description of systems and methods for data integration in a unified platform.

A method for data integration in a unified platform includes: storing, in an account database of a processing server, a plurality of account profiles, wherein each account profile includes a standardized data set of data related to a unified transaction and membership account including at least an account identifier, authentication information, and one or more transaction account numbers; receiving, by a receiving device of the processing server, a transaction message from a financial institution via a payment network, wherein the transaction message is formatted based on one or more standards and includes a plurality of data elements including at least a first data element configured to store a primary account number, a second data element configured to store a transacting merchant identifier, and one or more additional data elements; receiving, by the receiving device of the processing server, a first data signal superimposed with a first authentication request from a first application server via a communication network, wherein the first authentication request includes at least a specific account identifier, supplied authentication information, and a first authenticating merchant identifier; receiving, by the receiving device of the processing server, a second data signal superimposed with a second authentication request from a second application server via a communication network, wherein the second authentication request includes at least the specific account identifier, supplied authentication information, and a second authentication merchant identifier; executing, by a querying module of the processing server, a query on the account database to identify a specific account profile where the included account identifier corresponds to the specific account identifier and where one of the included one or more transaction account numbers corresponds to the primary account number; processing, by a transaction processing module of the processing server, the received transaction message based on at least data stored in the one or more additional data elements; authenticating, by an authentication module of the processing server, the first authentication request and the second authentication request based on a comparison of the included supplied authentication information and the authentication information included in the identified specific account profile; electronically transmitting, by a transmitting device of the processing server, a response transaction message to the financial institution via the payment network based on a result of the processing of the received transaction message; electronically transmitting, by the transmitting device of the processing server, a first authentication result to the first application server via the communication network based on a result of the authentication of the first authentication request; and electronically transmitting, by the transmitting device of the processing server, a second authentication result to the second application server via the communication network based on a result of the authentication of the second authentication request, wherein the transacting merchant identifier, the first authentication merchant identifier, and the second authentication merchant identifier are separate merchant identifiers and are included in a predetermined set of merchant identifiers associated with a group of related merchants.

A system for data integration in a unified platform includes: an account database of a processing server configured to store a plurality of account profiles, wherein each account profile includes a standardized data set of data related to a unified transaction and membership account including at least an account identifier, authentication information, and one or more transaction account numbers; a receiving device of the processing server configured to receive a transaction message from a financial institution via a payment network, wherein the transaction message is formatted based on one or more standards and includes a plurality of data elements including at least a first data element configured to store a primary account number, a second data element configured to store a transacting merchant identifier, and one or more additional data elements, a first data signal superimposed with a first authentication request from a first application server via a communication network, wherein the first authentication request includes at least a specific account identifier, supplied authentication information, and a first authenticating merchant identifier, and a second data signal superimposed with a second authentication request from a second application server via a communication network, wherein the second authentication request includes at least the specific account identifier, supplied authentication information, and a second authentication merchant identifier; a querying module of the processing server configured to execute a query on the account database to identify a specific account profile where the included account identifier corresponds to the specific account identifier and where one of the included one or more transaction account numbers corresponds to the primary account number; a transaction processing module of the processing server configured to process the received transaction message based on at least data stored in the one or more additional data elements; an authentication module of the processing server configured to authenticate the first authentication request and the second authentication request based on a comparison of the included supplied authentication information and the authentication information included in the identified specific account profile; and a transmitting device of the processing server configured to electronically transmit a response transaction message to the financial institution via the payment network based on a result of the processing of the received transaction message, a first authentication result to the first application server via the communication network based on a result of the authentication of the first authentication request, and a second authentication result to the second application server via the communication network based on a result of the authentication of the second authentication request, wherein the transacting merchant identifier, the first authentication merchant identifier, and the second authentication merchant identifier are separate merchant identifiers and are included in a predetermined set of merchant identifiers associated with a group of related merchants.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
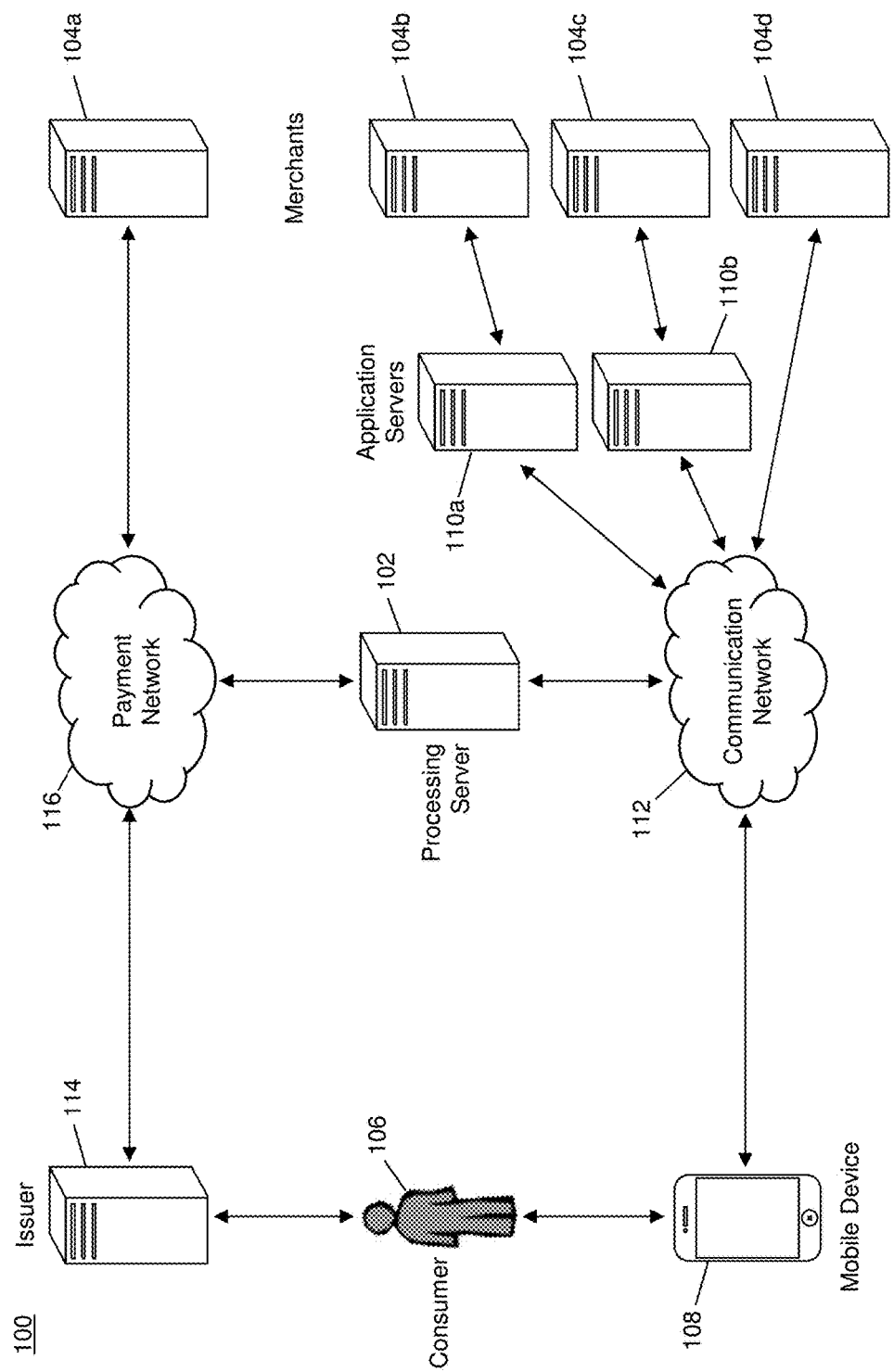
FIG. 1 is a block diagram illustrating a high level system architecture for the providing for data integration and payment processing for multiple related companies in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Data Integration and Payment Processing in a Unified Platform

FIG. 1 illustrates a system 100 for the integration of data and payment processing in a unified platform that services a plurality of merchants.

The system 100 may include a processing server 102. The processing server 102, discussed in more detail below, may be a configured to provide for a unified platform for a plurality of merchants 104 for the processing of payment transactions, data integration, and processing of authentication and user logins. The processing server 102 may consist of one or more computing servers and/or devices specially configured to perform the functions discussed herein, which may include the processing of payment transactions that utilize communications via specialized payment infrastructure.

The system 100 may include a plurality of merchants 104, illustrated in FIG. 1 as merchants 104a, 104b, 104c, and 104d. In some embodiments, each of the merchants 104 may be related. For instance, each merchant 104 may be included in a specific merchant industry, such as the music industry. In another example, each merchant 104 may be a subsidiary of a single merchant or entity. In yet another example, each merchant 104 may be part of a partnership or cooperative. Each of the merchants 104 may be configured to provide one or more services to the consumer 106 as part of their associated industry. For instance, if the merchant industry is the music industry, the merchants 104 may perform ticket purchasing, ticket distribution, ticket taking at a venue, music sales, music distribution, venue operation, food and beverage distribution, clothing sales, event coordination, etc.

In the system 100, a plurality of the merchants 104, such as the merchants 104b and 104c, may be configured to operate websites or application programs for use by a consumer 106 to access one or more services in the unified platform. The consumer 106 may access the services provided by the merchants 104b and 104c via a mobile device 108 or other computing device. The mobile device 108 or other computing device may be any type of computing device suitable for performing the functions disclosed herein, such as a desktop computer, laptop computer, notebook computer, tablet computer, cellular phone, smart phone, smart watch, smart television, wearable computing device, implantable computing device, etc.

The mobile device 108 may be configured to access services provided by the merchants 104b and 104c via application servers 110, illustrated in FIG. 1 as application servers 110a and 110b. Each application server 110 may be a specially configured computing device that is programmed to perform the associated functions of the application server 110. For instance, the application server 110a may be a web application server configured to host a website operated by or on behalf of the merchant 104b. The mobile device 108 may include a website browsing application program, which may be configured to navigate to the website hosted by the application server 110a via a communication network 112. In another example, the application server 110b may host an application program associated with the merchant 104c that may be executed by the mobile device 108 and accessed via the communication network 112 using cloud or other remote computing techniques. The communication network 112 may be of any suitable type of network and network topology and utilize communication protocols to carry data between the mobile device 108 and application servers 110 that is superimposed on data signals that are transmitted along network infrastructure. The communication network 112 may be, for example, the Internet, a cellular communication network, a local area network, a wireless area network, a radio frequency network, etc. In some instances, a combination of networks may be used in the communication network 112 to carry data signals between the mobile device 108 and application servers 110, such as a local area network, cellular communication network, the Internet, and a second local area network.

As part of the services provided by the merchants 104b and 104c via the application servers 110a and 110b, the application servers 110a and 110b may be required to authenticate the consumer 106, such as via login to the website or application program. In the system 100, the processing server 102 may be configured to provide authentication services to the application servers 110 and merchants 104 as part of the unified platform. In such instances, the consumer 106 may be registered with the processing server 102. The processing server 102 may store an account profile associated with the consumer 106 in a database, as discussed in more detail below. In some embodiments, the database may be a local database, which may be physically interfaced with the processing server 102 or a local computing system. In other embodiments, the database may be an external database, which may be accessed by the processing server 102 via remote computing techniques, such as via the communication network 112.

The consumer 106 may use their mobile device 108 or other suitable computing device to log in to a website or application program provided by one of the application servers 110. As part of the login process, the consumer 106 may submit authentication information to the application server 110. Authentication information may be any information suitable for use in authenticating that the consumer 106 is who they purport to be, such as a username, password, e-mail address, phone number, registration number, identification number, or any other suitable type of data or combination thereof. The authentication information may be superimposed on a data signal electronically transmitted from the mobile device 108 to the appropriate application server 110 via the communication network 112. The application server 110 may then forward the authentication information to the processing server 102 for authentication. In some embodiments, the authentication information may be submitted by the mobile device 108 directly to the processing server 102 via the communication network 112, without first going to the application server 110. In some instances, the processing server 102 may access the authentication information from the application server 110 via an application programming interface of the application server 110. In other instances, the application server 110 may utilize an application programming interface of the processing server 102 to electronically transmit the authentication information to the processing server 102 for authentication.

The processing server 102 may, using one or more processing modules or engines included therein, authenticate the consumer-supplied information by comparing it to the information stored for the consumer 106 in their associated account profile. The processing server 102 may then superimpose the result of the authentication on a data signal that is electronically transmitted to the appropriate application server 110. If the authentication is successful, the application server 110 may provide the consumer 106 with the associated services. If the authentication is unsuccessful, the application server 110 may notify the consumer 106 by electronically transmitting a notification superimposed on a data signal to the mobile device 108 via the communication network 112.

The processing server 102 may also be configured to perform authentication and other data services directly for merchants 104. For instance, the merchant 104d may request data associated with the consumer 106 from the processing server 102, such as the existence of an electronic ticket for a concert that the consumer 106 is trying to attend. For example, the consumer 106 may present an electronic ticket to a concert venue using their mobile device 108. The merchant 104d at the venue may identify the electronic ticket and may electronically transmit a data signal superimposed with the electronic ticket information and other consumer data to the processing server 102 via the communication network 112. The processing server 102 may include a parsing module that may be configured to parse the data signal, which may then identify an account profile for the consumer 106 based on the data included therein. In other words, the processing server 102 may deconstruct the data signal into data segments that include data values usable by the processing server 102 in identification of account profiles. The processing server 102 may verify that the consumer 106 has genuinely purchased the electronic ticket and that it is applicable for use, such as by comparing data encoded in the electronic ticket with stored data associated with the electronic ticket, and may electronically transmit a data signal back to the merchant 104d via the communication network 112 that is superimposed with an indication if the verification was successful or unsuccessful. The merchant 104d may then perform any appropriate actions, such as by granting the consumer 106 access to the venue.

The processing server 102 may also be configured to process payment transactions as part of the unified platform provided to the merchants 104 and consumers 106. The consumer 106 and a merchant 104a may be involved in a payment transaction, where the consumer 106 wants to purchase goods or services provided by the merchant 104a, such as tickets for a concert or festival, merchandise via the Internet or at a concert venue, food or beverages at a location during a festival, etc. The consumer 106 may have a transaction account established with an issuer 114. The issuer 114 may be a financial institution, such as an issuing bank, configured to issue transaction accounts to consumers 106 for use in funding payment transactions. The consumer 106 may initiate a payment transaction with the merchant 104a (e.g., at a point of sale device) and may, during the initiation, present payment details to use their transaction account with the issuer 114 in funding the transaction. The payment details may be presented via a payment card that is encoded with the payment details (e.g., in an integrated circuit, a magnetic strip, etc.), a payment document that includes the payment details in magnetic ink, the mobile device 108 that locally or remotely stores the payment details for transmission via a communication network 112 or near field communication, etc. The merchant 104a may receive the payment details, and may then initiate processing of the payment transaction.

Detailed system architecture for the processing of a payment transaction is discussed in more detail below in the system 500 illustrated in FIG. 5 and discussed below. During the processing of the payment transaction, a transaction message may be electronically transmitted to the processing server 102 via a payment network 116. The transaction message may be submitted by an acquiring financial institution associated with the merchant 104a, such as an acquiring bank, directly using the payment network 116 or via one or more service providers and/or transaction processing devices, such as gateway processors, integrated payment processors, etc. The transaction messages may be formatted pursuant to one or more standards governing the formatting and transmission of transaction messages for payment transactions, such as the International Organization for Standardization's ISO 8583 standard. The transaction message may include a plurality of data elements, each configured to store data as set forth in the associated standard(s). For instance, the transaction message received by the processing server 102 may include at least a first data element configured to store a primary account number (e.g., associated with the transaction account whose payment details were submitted by the consumer 106), a second data element configured to store a merchant identifier (e.g., associated with the merchant 104a), and one or more additional data elements, such as data elements configured to store a transaction amount, transaction time and/or date, geographic location, point of sale data, merchant data, consumer data, offer data, loyalty data, reward data, and any other transaction data.

The payment network 116 may be a specialized communication network configured to electronically transmit transaction message between financial institutions and other entities for the processing of payment transactions. In some embodiments, the processing server 102 may be part of the payment network 116 directly. In other embodiments, the processing server 102 may be external to the payment network 116 and access the payment network 116 and data contained therein using the payment rails. The payment rails may be the specialized network infrastructure associated with the payment network 116 used in the transfer of transaction messages between financial institutions and entities associated with the payment network 116. The payment rails may be different from a traditional communication network due to the inclusion of a plurality of redundancies, protections, transaction processors, and communication channels to ensure that sensitive financial information is securely transmitted and reaches its destination, as discussed in more detail in below with respect to the system 500 illustrated in FIG. 5.

The processing server 102 may parse (e.g., deconstruct into data elements) the received transaction message to obtain the data included therein, and may utilize the data to process the payment transaction using traditional transaction processing methods and systems. For instance, as part of the processing, the transaction message may be forwarded (e.g., via electronic transmission) to the issuer 114. The issuer 114 may identify the transaction account of the consumer 106 that the consumer 106 presented to the merchant 104a for funding of the payment transaction, and may determine if the transaction is to be approved or denied. Approval or denial of the transaction may be based on, for instance, available credit, likelihood of fraud, consumer-provided account controls, issuer-provided account controls, etc. The issuer 114 may return the determination to the processing server 102 via the payment network 116. In some instances, the determination may be included in a data element of the transaction message, which may be returned to the processing server 102 using the payment network 116. The processing server 102 may then forward the transaction message with the determination to the merchant 104a via the payment network 116 and any intermediate transaction processors and financial institutions. The merchant 104a may then finalize the payment transaction based on the determination. For example, if the transaction is approved, the merchant 104a may provide the transacted-for goods or services to the consumer 106.

In some embodiments, the account profile for each consumer 106 may include transaction account numbers for transaction accounts involving the associated consumer 106. In such an embodiment, the processing server 102 may be configured to provide the transaction account number on behalf of the consumer 106 for use in payment transactions. For example, in transacting with the merchant 104a, the consumer 106 may present their authentication information to the merchant 104a, which may forward the authentication information to the processing server 102. The processing server 102 may authenticate the consumer 106 using the authentication information and may then provide the associated transaction account number to the merchant 104a for use in the payment transaction. In some cases, the processing server 102 may immediately proceed in processing the payment transaction using the transaction account number, such as if the merchant 104a provides the authentication information along with other transaction details to the processing server 102. In such embodiments, the consumer 106 may be able to transact with merchants 104 using their unified account, without having to manually provided payment information, which may provide consumers 106 and merchants 104 both with additional security and convenience.

The use of a unified platform provided by the processing server 102 may result in a significant number of benefits for consumers 106 and merchants 104 alike that may be unavailable to individually situated merchants in traditional systems. For instance, by providing authentication services to merchants 104, the processing server 102 may ensure that the consumer 106 needs only a single set of authentication information instead of different logins with each merchant 104, some of whom may use different criteria and settings that may make management of multiple sets of credentials difficult, and may also provide for greater efficiency for merchants 104 where authentication processing and storage need not be used. In addition, by providing for unified payment transaction processing, the processing server 102 may ensure that each merchant 104 is connected to a payment network 116 for processing such that they can service each of the consumers 106 on the platform with higher efficiency, and can also benefit consumers 106 as they can be ensured that a single payment method is always available at every merchant 104 on the platform, and may also be able to transact directly with merchants 104 using their authentication information rather than payment credentials, resulting in stronger security for every entity involved in the process. Thus, the system 100 discussed herein provides for systems and methods for data integration in a unified platform that provides for more efficient and secure merchant and consumer solutions.

Processing Server

Figure 2:
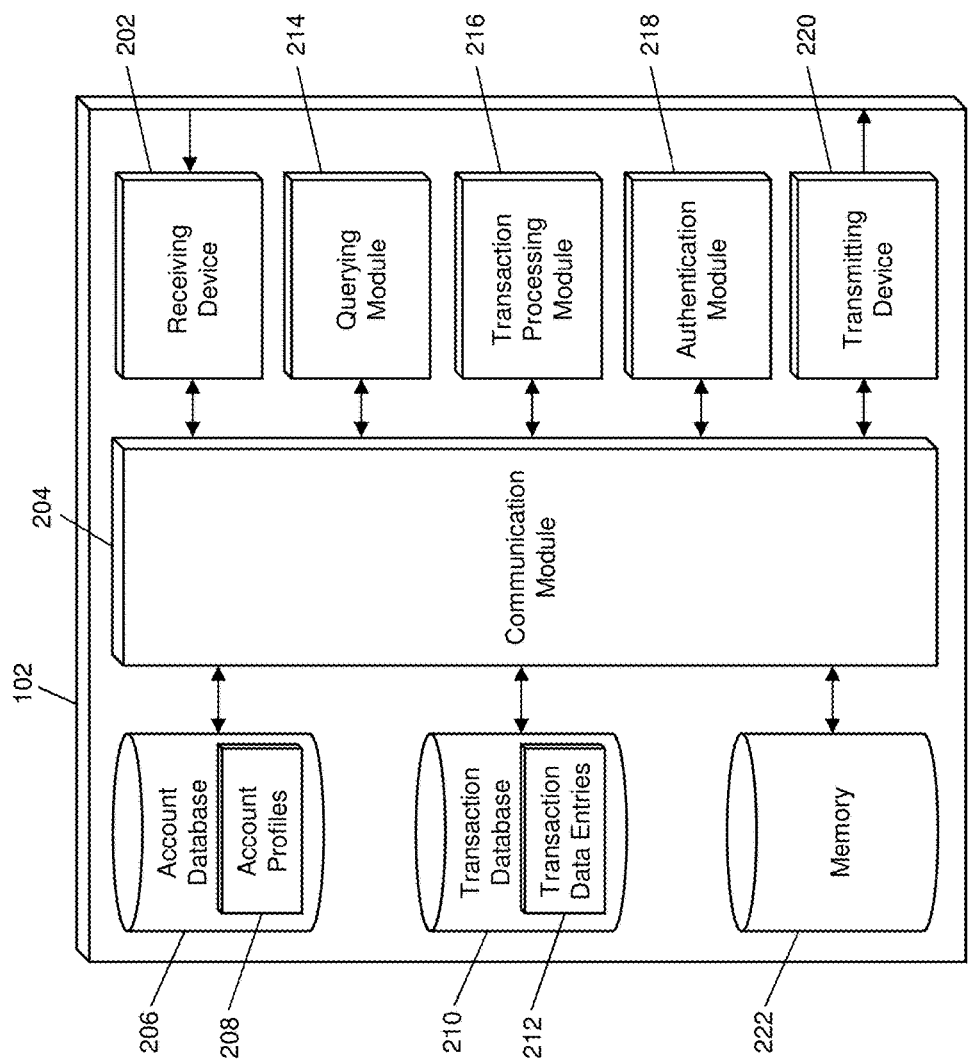
FIG. 2 is a block diagram illustrating the processing server of FIG. 1 for the providing of data integration and payment process in a unified platform in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from merchants 104, application servers 110, issuers 114, and other entities via alternative networks, such as the Internet. In some embodiments, the receiving device 202 may be comprised of multiple units, such as different receiving units for receiving data over different networks, such as a first receiving unit for receiving data over payment rails and a second receiving unit for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon.

The receiving device 202 may be configured to receive registration data from consumers 106 for registration with the unified platform provided by the processing server 102. The registration data may be superimposed on data signals electronically transmitted by the consumer 106 using their mobile device 108 or other computing device via the communication network 112. In some instances, registration data may be received via an application programming interface associated with the processing server 102. Registration data may include, for example, authentication information, such as a username and password, a device identifier associated with one or more computing devices to be used by the consumer 106, transaction account numbers or other payment details, and other suitable information. The receiving device 202 may also be configured to receive authentication requests, which may be superimposed on data signals electronically transmitted by the mobile device 108, application servers 110, merchants 104, or other entities that may authenticate a consumer 106. In some instances, authentication requests may be provided via an application programming interface associated with the processing server 102. Authentication requests may include at least information identifying the consumer 106 to be authenticated, supplied authentication information, and destination information. For instance, the mobile device 108 may supply authentication information for authentication by the processing server 102, with the destination of the authentication determination being the application server 110 for login to a website or application program.

The receiving device 202 may also be configured to receive transaction messages. Transaction messages may be received via the payment network 116 and/or the payment rails, which may utilize transaction processing devices and a plurality of financial institutions and other entities to route transaction data in a specialized formatted data message from a merchant 104 to the processing server 102 for processing. Transaction messages may be formatted based on one or more standards, such as the ISO 8583 standard, and include a plurality of data elements, such as a data element configured to store a primary account number, a data element configured to store a merchant identifier, and additional data elements configured to store transaction data, such as transaction amounts, transaction times and/or dates, etc. In some instances, a transaction message may include data indicative of the data elements included therein, such as a bitmap, which may be included as set of rth in the associated standards.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc.

The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device. For example, as illustrated in FIG. 2, the processing server 102 may include a querying module 214, a transaction processing module 216, and an authentication module 218, which may comprise a processing device of the processing server 102, such as may be incorporated in one or more processors having one or more processor cores. In some instances, the modules may be implemented using a combination of hardware (e.g., of the processor) and software, which may comprise application programs having program code stored in the processing server 102 and executed by a processor. It will be apparent to persons having skill in the relevant art that the processing server 102 may include additional modules and/or engines suitable for performing the functions discussed herein, such as a parsing module for parsing data signals received by the receiving device 202.

The processing server 102 may also include an account database 206. The account database 206 may be configured to store a plurality of account profiles 208. Each account profile 208, discussed in more detail below, may be configured to store a standardized data set comprising data related to a unified transaction and membership account. Each account profile 208 may include, for example, an account identifier, transaction account numbers, and authentication information.

In some embodiments, the processing server 102 may also include a transaction database 210. The transaction database 210 may be configured to store a plurality of transaction data entries 212. Each transaction data entry 212 may comprise a transaction message for a payment transaction and include data stored in data elements contained therein. The payment transactions may include payment transactions processed by the processing server 102 involving one or more consumers 106 that are registered for the service provided by the processing server 102. In some embodiments, a consumer 106 may opt-in to have their transaction data stored in the transaction database 210. In some instances, all transaction data entries 212 stored in the transaction database 210 may have personally identifiable information removed or otherwise obscured. For instance, primary account numbers in the transaction data entries 212 may be removed or replaced with alternative identifiers, such as hashed account numbers, such that the associated account profiles 208 or consumers 106 may not be identifiable from the transaction data entry 212. In such instances, the processing server 102 may utilize the transaction data, such as to provide additional services to merchants 104, without comprising privacy of the consumers 106.

The querying module 214 of the processing server 102 may be configured to execute queries on the account database 206 and transaction database 210. For instance, the querying module 214 may be configured to receive a query as input that is executed on the account database 206 to identify an account profile 208, such as related to an authentication request received and parsed by the receiving device 202. The query's execution may result in retrieval of the identified account profiles 208 from the account database 205. Account profiles 208 may be identified using the included account identifier, discussed in more detail below, or other suitable method. In another example, the querying module 214 may execute a query on the transaction database 210 to identify transaction data entries 212 included therein, such as to retrieve transaction data for analysis for a merchant 104, such as to identify purchase trends and sales data for the merchant 104.

The transaction processing module 216 may be configured to process payment transactions. The transaction processing module 216 may perform processing based on the data stored in the data elements included in the transaction message received by the receiving device 202. For example, the transaction processing module 216 may identify an issuer 114 associated with the payment transaction related to a transaction message based on a data element included therein that is configured to store data associated with the issuer 114, such as a financial institution identifier, the primary account number (e.g., where a bank identification number is included therein), etc. The transaction processing module 216 may then perform any additional services associated with the issuer 114, such as scoring the transaction for likelihood of fraud using one or more fraud algorithms. The transaction processing module 216 may be further configured to route the transaction message for forwarding to the issuer 114, and may also be configured to route transaction response messages from the issuer 114 to the appropriate financial institution or other entity to provide the response to the merchant 104.

The authentication module 218 may be configured to authenticate consumers 106 based on data stored in the account database 206 and received in authentication requests received and parsed by the receiving device 202. When an authentication request is received, the querying module 214 may execute a query to identify the account profile 208 involved using the account identifier, and may provide (e.g., via the communication module 204) the account profile 208 data to the authentication module 218. The authentication module 218 may compare the authentication information in the account profile 208 with authentication information supplied by the consumer 106 and included in the authentication request. The authentication module 218 may generate a result (e.g., pass or fail, approve or deny, positive or negative, etc.) based on the authentication, which may be forwarded on to the appropriate entity.

In some embodiments, the processing server 102 may include additional modules or engines suitable for performing the functions of the processing server 102 as discussed herein. For example, the processing server 102 may include a transaction analytical engine, which may be configured to analyze transaction data stored in transaction data entries 212 in the transaction database 210 (e.g., to identify transaction behaviors, trends, consumer interests, industry forecasts, etc.), a reporting module configured to generate reports based on authentication determinations or transaction analysis, a registration module configured to generate new account profiles 208 when a new consumer 106 registers, an encryption module configured to encrypt data or data signals for transmission, a fraud engine configured to generate fraud scores and fraud determinations for payment transactions, etc.

The processing server 102 may further include a transmitting device 220. The transmitting unit 206 may be configured to transmit data over one or more networks via one or more network protocols. In some embodiments, the transmitting device 220 may be configured to transmit data over the payment rails, such as using specially configured infrastructure associated with payment networks 116 for the transmission of transaction messages that include sensitive financial data and information, such as identified payment credentials. In some instances, the transmitting device 220 may be configured to transmit data to merchants 104, mobile devices 108, application servers 110, issuers 114, and other entities via alternative networks, such as the Internet. In some embodiments, the transmitting device 220 may be comprised of multiple units, such as different transmitting units for transmitting data over different networks, such as a first transmitting unit for transmitting data over the payment rails and a second transmitting unit for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to transmit transaction messages via the payment network 116 using the payment rails. The transmitting device 220 may be configured to transmit transaction messages to issuers 114 and to other financial institutions or entities, such as transaction processing entities, acquiring financial institutions, gateway processors, etc. The transmitting device 220 may also transmit authentication determinations, such as via the communication network 112. Authentication determinations may be transmitted, for instance, to mobile devices 108, application servers 110, merchants 104, etc. In some instances, the transmitting device 220 may be configured to transmit reports, notifications, and additional data that may be superimposed on data signals electronically transmitted by the transmitting device 220 to other entities in the system 100.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for application programs, rules and algorithms for producing fraud scores, electronic ticket data and information, and other data that may be suitable for use by the processing server 102 in the performance of the functions disclosed herein as will be apparent to persons having skill in the relevant art.

In embodiments where visual content selections may be identified by the processing server 102, the components of the processing server 102 illustrated in FIG. 2 and discussed herein may be configured to perform the functions discussed above as related to visual content alternatively or in addition to music. For instance, the processing server 102 may include a visual content database, similar to the music database 220, configured to store visual content selections and associated demographic characteristics, the processing unit 204 may be configured to identify visual content selections based on demographic characteristics, the transmitting unit 206 may be configured to transmit visual content selections, etc.

Account Database and Profiles

Figure 3:
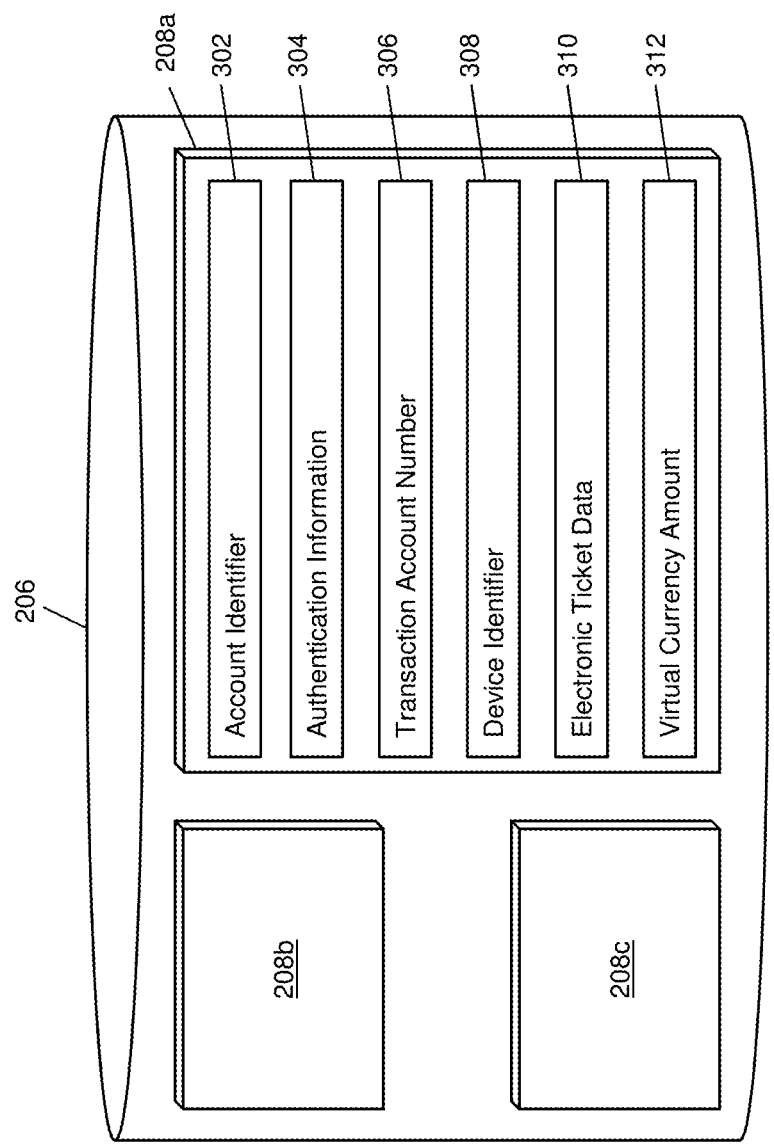
FIG. 3 is a block diagram illustrating the account database of the processing server of FIG. 2 for data integration in a unified platform in accordance with exemplary embodiments in accordance with exemplary embodiments.

FIG. 3 illustrates the account database 206 of the processing server 102 for the storing of account profiles 210. Each account profile 210 may include data related to a unified transaction and membership account that may be associated with one or more consumers 106 and/or mobile devices 108.

The account database 206 may be configured to store a plurality of account profiles 208, illustrated in FIG. 3 as account profiles 208a, 208b, and 208c. Each account profile 208 may be configured to store a standardized data set that may include at least an account identifier 302, authentication information 304, and one or more transaction account numbers 306. The account identifier 302 may be a unique value that is associated with the account profile 208 and used for the identification thereof. The account identifier 302 may be, for example, a username, e-mail address, telephone number, identification number, serial number, or other suitable value. In some instances, the account identifier 302 may be a transaction account number 306, a device identifier, device fingerprint, or other suitable value.

The authentication information 304 may be information suitable for use by the processing server 102 and other entities in authentication of a consumer 106 and/or mobile device 108 alleging to be associated with a specific account profile 208. The authentication information may include one of more of a username, password, e-mail address, security key, phone number, device fingerprint, device identifier, personal identification number, etc. For example, the authentication information 304 may be a combination of username and password.

The transaction account numbers 306 may be numbers associated with transaction accounts to which the related consumer 106 has access to and may use in the funding of payment transactions. The transaction account numbers 306 may correspond to primary account numbers included in transaction messages received by the receiving device 202 of the processing server 102 for payment transactions. In some embodiments, an account profile 208 may include one or more mapped account numbers. For example, each transaction account number 306 may be a real account number used in the processing of payment transactions, with a corresponding mapped account number being provided to the mobile device 108 or merchants 104 for use when initiating payment transactions. The processing server 102 may be configured to swap the mapped account number with the corresponding transaction account number 306 when processing payment transactions, such that the merchant 104 and mobile device 108 may not be in possession of the actual transaction account number 306. In such instances, transaction controls may be associated with the mapped account numbers as to increase the security of the related transaction account.

In some embodiments, an account profile 208 may further include a device identifier 308. The device identifier 308 may be associated with a computing device, such as a mobile device 108, associated with the respective account profile 208. The device identifier 308 may be a unique value suitable for use in identification of the corresponding computing device, such as an internet protocol address, media access control address, registration number, serial number, identification number, device fingerprint, etc. In some instances, an account profile 208 may include multiple device identifiers 308, such as a separate device identifier 308 for each computing device that may be used by the consumer 106 associated with the account profile 208. For example, an account profile 208 may include a device identifier 308 associated with a desktop computer used by a consumer 106 to purchase a concert ticket, as well as a device identifier 308 associated with a mobile device 108 to which an electronic ticket is provisioned for presentation at the concert venue.

In some instances, an account profile 208 may also include electronic ticket data 310, a virtual currency amount 312, or other data associated with the platform provided by the processing server 102. For instance, the electronic ticket data 310 may include data associated with an electronic ticket for an event, such as an identification number, seat information, pricing information, accessibility information, etc. The virtual currency amount 312 may be an amount of a virtual currency associated with the account profile 208 that may be used by the consumer 106 or other person associated with the account for the purchase of goods and services. For instance, a consumer 106 may use virtual currency to make purchases at a festival associated with merchants 104 that are part of the platform provided by the processing server 102. Additional data that may be included in addition to or in place of the electronic ticket data 310 and the virtual currency amount 312 may be dependent on the merchants 104 associated with the platform and the associated merchant industry.

Additional data that may be included in an account profile 208 will be apparent to persons having skill in the relevant art. For example, an account profile 208 may further include account preferences (e.g., notification preferences, transaction limits, processing rules, etc.), contact information (e.g., e-mail addresses, device identifiers, phone numbers, street addresses, etc.), contact preferences, reward data, loyalty data, offer data, etc. In some instances, additional data may be dependent on the merchant industry associated with the merchants 104. For instance, if the merchants 104 are associated with the music industry, an account profile 208 may include data associated with musical preferences of the related consumer 106.

Exemplary Method for Data Integration in a Unified Platform

Figure 4:
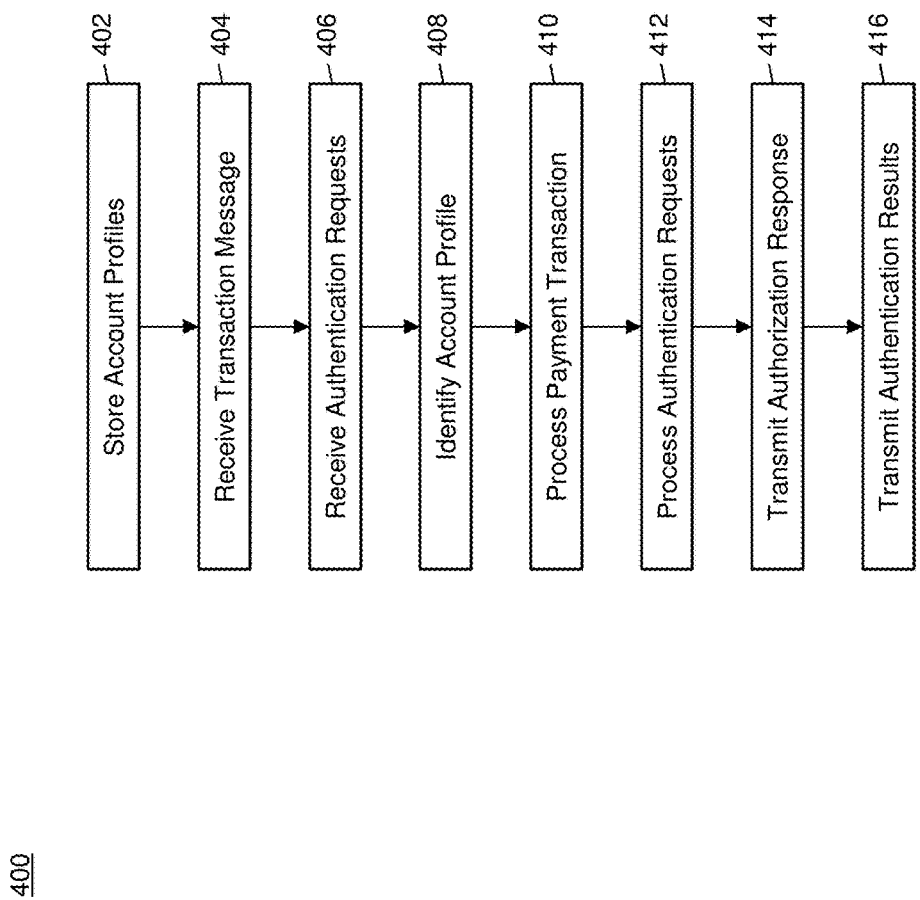
FIG. 4 is a flow diagram illustrating an exemplary method for data integration in a unified platform in accordance with exemplary embodiments.

FIG. 4 illustrates a method 400 for the integration of data in a unified platform for authentication and transaction processing for a plurality of related merchants.

In step 402, account profiles 208 may be stored in an account database 206 of the processing server 102. The account database 206 may include a plurality of account profiles 208, where each account profile 208 includes a standardized data set related to a unified transaction and membership account and may include at least an account identifier 302, authentication information 304, and one or more transaction account numbers 306. In step 404, a transaction message may be received by the processing server 102. The receiving device 202 of the processing server 102 may receive the transaction message from a financial institution (e.g., an acquiring financial institution associated with a merchant 104). The transaction message may be formatted based on one or more standards and include a plurality of data elements, including at least a first data element configured to store a primary account number, a second data element configured to store a transacting merchant identifier, and one or more additional data elements.

In step 406, the receiving device 202 of the processing server 102 may receive authentication requests. The receiving device 202 may receive a first authentication request superimposed on a data signal electronically transmitted from a first application server (e.g., application server 110 or merchant 104) via a communication network 112, wherein the first authentication request includes at least a specific account identifier, supplied authentication information, and a first authenticating merchant identifier. The receiving device 202 may also receive a second authentication request superimposed on a data signal electronically transmitted from a second application server via the communication network 112, wherein the second authentication request includes the specific account identifier, the supplied authentication information, and a second authentication merchant identifier. In some embodiments, the first and second authentication merchant identifiers may be different identifiers.

In step 408, an account profile 208 associated with the authentication requests and payment transaction may be identified. The querying module 214 of the processing server 102 may execute a query on the account database 206 to identify an account profile 208 where the account identifier 302 included therein corresponds to the specific account identifier included in the authentication requests, and where one of the included one or more transaction account numbers 306 corresponds to the primary account number stored in the first data element in the received transaction message. In step 410, the payment transaction may be processed. Processing of the payment transaction may be performed by the transaction processing module 216 of the processing server 102 and may be based on at least data stored in the one or more additional data elements, such as for routing to an issuer 114 or for the performing of additional services (e.g., fraud scoring) for the payment transaction.

In step 412, the authentication requests may be processed by the processing server 102. The authentication module 218 may authentication each of the two authentication requests based on a comparison of the supplied authentication information in each request and the authentication information 304 included in the specific account profile 208 identified by the querying module 214. In step 414, the authorization response for the payment transaction may be transmitted to the financial institution (e.g., acquiring financial institution). The authorization response may be the transaction message with a response code included indicating approval or denial of the payment transaction that may be electronically transmitted by the transmitting device 220 of the processing server 102 to the financial institution via the payment network 116.

In step 416, the authentication results may be transmitted by the transmitting device 220 to the appropriate application servers. A first authentication result may be electronically transmitted to the first application server via the communication network 112 based on the result of the authentication of the first authentication request. A second authentication result may be electronically transmitted to the second application server via the communication network 112 based on a result of the authentication of the second authentication request. In some embodiments, each authentication request may include destination information. In such embodiments, the authentication result for each authentication request may be electronically transmitted to the indicated destination. In some instances, each authentication result may be superimposed on a data signal that is electronically transmitted to the respective application server.

In an exemplary embodiment, the transacting merchant identifier, the first authentication merchant identifier, and the second authentication identifier may be separate merchant identifiers and may each be included in a predetermined set of merchant identifiers (e.g., stored in the memory 222 of the processing server 102) associated with a group of related merchants 104. In some embodiments, each merchant 104 in the group of related merchants may be a subsidiary of a primary merchant. In other embodiments, each merchant 104 in the group of related merchants may be associated with a common merchant industry. In a further embodiment, the received transaction message may further include a third data element configured to store a merchant category code, the merchant category code being associated with the common merchant industry.

In some embodiments, processing of the transaction message may comprise electronically transmitting, by the transmitting device 220 of the processing server 102, the received transaction message to a second financial institution (e.g., the issuer 114) associated with a transaction account corresponding to the primary account number via the payment network 116, and receiving, by the receiving device 202 of the processing server 102, the response transaction message from the second financial institution via the payment network 116, wherein the response transaction message includes a fourth data element configured to store a response code indicative of approval or denial of a related payment transaction. In a further embodiment, the received transaction message may include a message type indicator indicative of an authorization request, and the response transaction message may include a message type indicator indicative of an authorization response. In another further embodiment, the received transaction message may include a fifth data element configured to store an issuer identifier associated with the second financial institution.

In some embodiments, the one or more standards associated with transaction messages used for the formatting thereof may include the ISO 8583 standard. In one embodiment, each account profile 208 may further include electronic ticketing data 310 associated with a ticket for an event, the event being associated with an event merchant identifier included in the predetermined set of merchant identifiers associated with the group of related merchants and separate from the transacting merchant identifier, the first authentication merchant identifier, and the second authentication merchant identifier. In some embodiments, each account profile 208 may further include a device identifier 308 associated with a mobile communication device (e.g., mobile device 108) having an electronic wallet application program installed therein that includes data associated with at least one of the one or more transaction account numbers 306 included in the respective account profile 208.

Payment Transaction Processing System and Process

Figure 5:
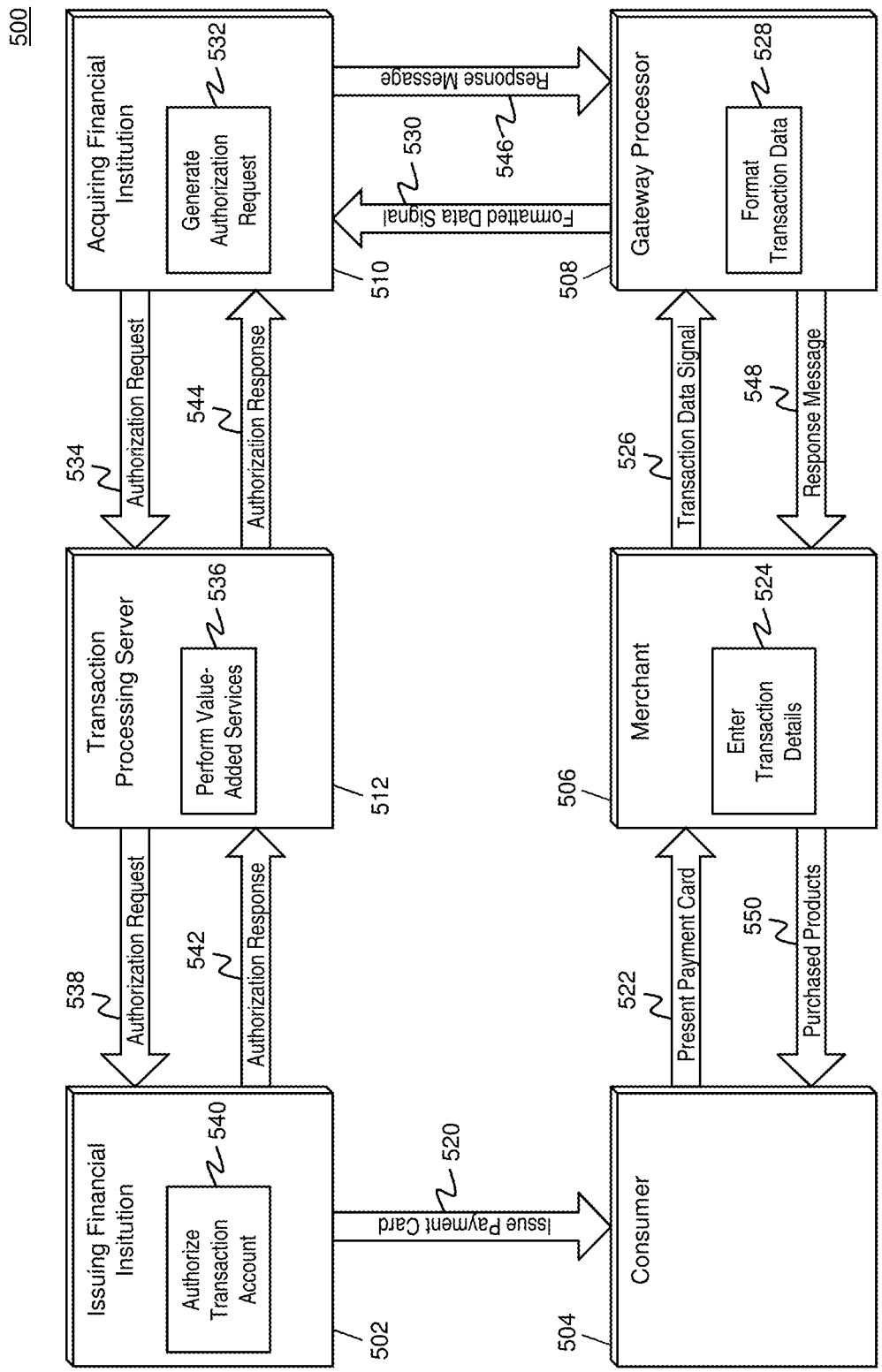
FIG. 5 is a block diagram illustrating a transaction processing system in accordance with exemplary embodiments.

FIG. 5 illustrates a transaction processing system and a process 500 for the processing of payment transactions in the system. The process 500 and steps included therein may be performed by one or more components of the system 100 discussed above, such as the consumer 106, merchant 104, processing server 102, payment network 116, and issuer 114. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the process illustrated in FIG. 4, discussed above, with respect to the step or steps involved in the processing of a payment transaction. In addition, the entities discussed herein for performing the process 500 may include one or more computing devices or systems configured to perform the functions discussed below. For instance, the merchant 504 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 540 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
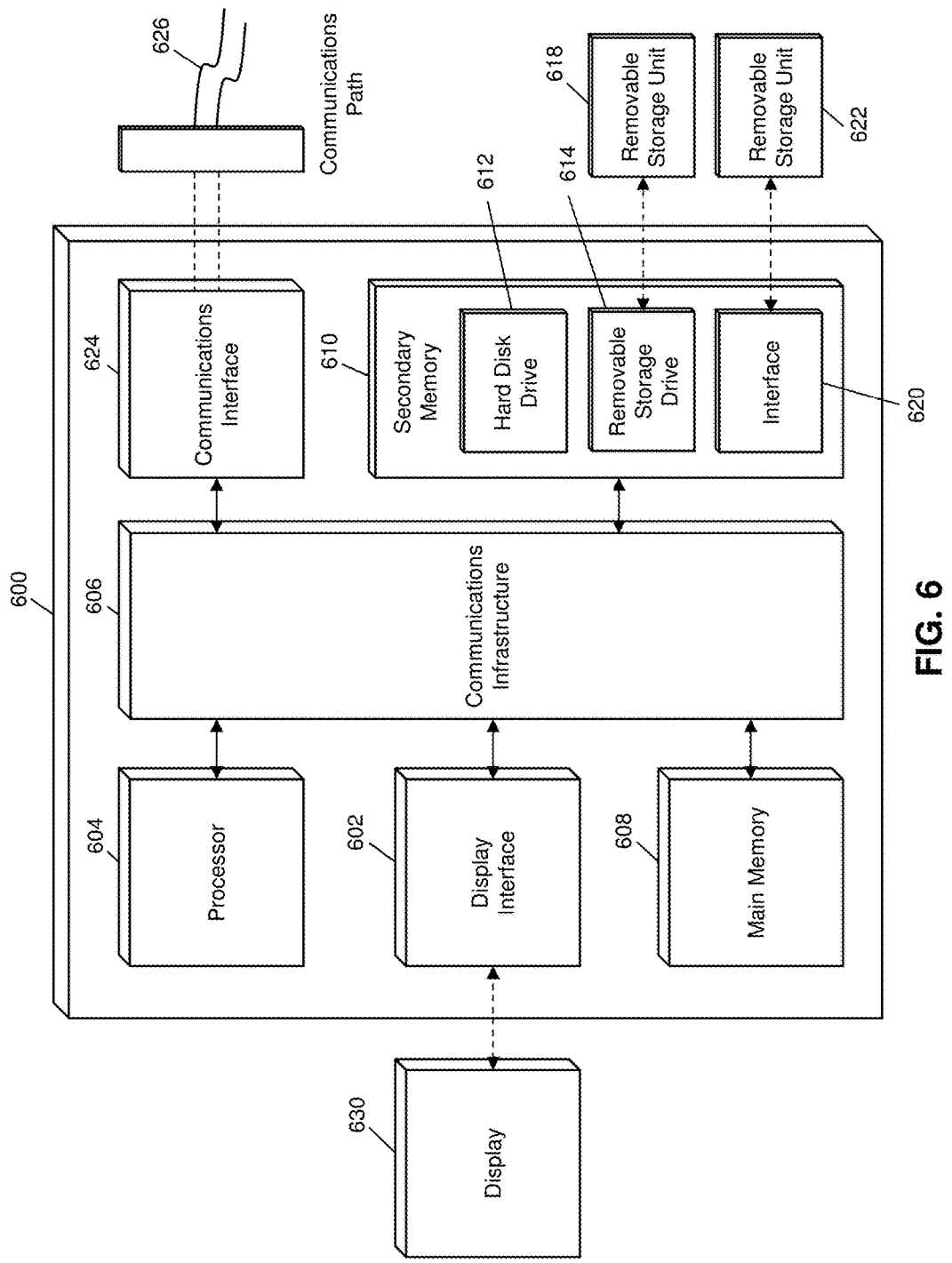
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 4 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for identifying music selections and visual content selections based on transaction history and consumer demographic characteristics. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for data integration in a unified platform, comprising:

storing, in an account database of a processing server, a plurality of account profiles, wherein each account profile includes a standardized data set of data related to a unified transaction and membership account including at least an account identifier, authentication information, and one or more transaction account numbers;

establishing, by the processing server, communication with a payment network and communication with a financial institution using the payment network;

establishing, by the processing server, communication with a communication network and communication with a first application server and a second application server using the communication network, wherein the first application server and second application server are separate computing systems;

receiving, by a receiving device of the processing server, a transaction message from the financial institution via payment rails of the payment network, wherein the transaction message is formatted based on one or more standards and includes a plurality of data elements including at least a first data element configured to store a primary account number, a second data element configured to store a transacting merchant identifier, and one or more additional data elements;

receiving, by the receiving device of the processing server, a first data signal superimposed with a first authentication request from the first application server via the communication network, wherein the first authentication request includes at least a specific account identifier, supplied authentication information, and a first authenticating merchant identifier;

receiving, by the receiving device of the processing server, a second data signal superimposed with a second authentication request from the second application server via the communication network, wherein the second authentication request includes at least the specific account identifier, supplied authentication information, and a second authentication merchant identifier;

executing, by a querying module of the processing server, a query on the account database to identify a specific account profile where the included account identifier corresponds to the specific account identifier and where one of the included one or more transaction account numbers corresponds to the primary account number;

processing, by a transaction processing module of the processing server, the received transaction message based on at least data stored in the one or more additional data elements;

authenticating, by an authentication module of the processing server, the first authentication request and the second authentication request based on a comparison of the included supplied authentication information and the authentication information included in the identified specific account profile;

electronically transmitting, by a transmitting device of the processing server, a response transaction message to the financial institution via the payment rails of the payment network based on a result of the processing of the received transaction message;

electronically transmitting, by the transmitting device of the processing server, a first authentication result to the first application server via the communication network based on a result of the authentication of the first authentication request; and electronically transmitting, by the transmitting device of the processing server, a second authentication result to the second application server via the communication network based on a result of the authentication of the second authentication request, wherein the transacting merchant identifier, the first authentication merchant identifier, and the second authentication merchant identifier are separate merchant identifiers and are included in a predetermined set of merchant identifiers associated with a group of related merchants.

2. The method of claim 1, wherein each merchant in the group of related merchants is a subsidiary of a primary merchant.

3. The method of claim 1, wherein each merchant in the group of related merchants is associated with a common merchant industry.

4. The method of claim 3, wherein the received transaction message further includes a third data element configured to store a merchant category code, where the merchant category code is associated with the common merchant industry.

5. The method of claim 1, wherein processing the received transaction message comprises:

electronically transmitting, by the transmitting device of the processing server, the received transaction message to a second financial institution associated with a transaction account corresponding to the primary account number via the payment network; and receiving, by the receiving device of the processing server, the response transaction message from the second financial institution via the payment network, wherein the response transaction message includes a fourth data element configured to store a response code indicative of approval or denial of a related payment transaction.

6. The method of claim 5, wherein
the received transaction message includes a message type indicator indicative of an authorization request, and
the response transaction message includes a message type indicator indicative of an authorization response.

7. The method of claim 5, wherein the received transaction message further includes a fifth data element configured to store an issuer identifier associated with the second financial institution.

8. The method of claim 1, wherein the one or more standards includes the ISO 8583 standard.

9. The method of claim 1, wherein each account profile further includes electronic ticketing data associated with a ticket for an event, the event being associated with an event merchant identifier included in the predetermined set of merchant identifiers associated with the group of related merchants and separate from the transacting merchant identifier, the first authentication merchant identifier, and the second authentication merchant identifier.

10. The method of claim 1, wherein each account profile further includes a device identifier associated with a mobile communication device having an electronic wallet application program installed therein that includes data associated with at least one of the one or more transaction account numbers included in the respective account profile.

11. A system for data integration in a unified platform, comprising:

an account database of a processing server configured to store a plurality of account profiles, wherein each account profile includes a standardized data set of data related to a unified transaction and membership account including at least an account identifier, authentication information, and one or more transaction account numbers;

the processing server configured to
establish communication with a payment network and communication with a financial institution using the payment network, and
establish communication with a communication network and communication with a first application server and a second application server using the communication network, wherein the first application server and second application server are separate computing systems;

a receiving device of the processing server configured to receive
a transaction message from the financial institution via payment rails of the payment network, wherein the transaction message is formatted based on one or more standards and includes a plurality of data elements including at least a first data element configured to store a primary account number, a second data element configured to store a transacting merchant identifier, and one or more additional data elements,
a first data signal superimposed with a first authentication request from the first application server via the communication network, wherein the first authentication request includes at least a specific account identifier, supplied authentication information, and a first authenticating merchant identifier, and
a second data signal superimposed with a second authentication request from the second application server via the communication network, wherein the second authentication request includes at least the specific account identifier, supplied authentication information, and a second authentication merchant identifier;

a querying module of the processing server configured to execute a query on the account database to identify a specific account profile where the included account identifier corresponds to the specific account identifier and where one of the included one or more transaction account numbers corresponds to the primary account number;

a transaction processing module of the processing server configured to process the received transaction message based on at least data stored in the one or more additional data elements;

an authentication module of the processing server configured to authenticate the first authentication request and the second authentication request based on a comparison of the included supplied authentication information and the authentication information included in the identified specific account profile; and a transmitting device of the processing server configured to electronically transmit a response transaction message to the financial institution via the payment rails of the payment network based on a result of the processing of the received transaction message, a first authentication result to the first application server via the communication network based on a result of the authentication of the first authentication request, and a second authentication result to the second application server via the communication network based on a result of the authentication of the second authentication request, wherein the transacting merchant identifier, the first authentication merchant identifier, and the second authentication merchant identifier are separate merchant identifiers and are included in a predetermined set of merchant identifiers associated with a group of related merchants.

12. The system of claim 11, wherein each merchant in the group of related merchants is a subsidiary of a primary merchant.

13. The system of claim 11, wherein each merchant in the group of related merchants is associated with a common merchant industry.

14. The system of claim 13, wherein the received transaction message further includes a third data element configured to store a merchant category code, where the merchant category code is associated with the common merchant industry.

15. The system of claim 11, wherein processing the received transaction message comprises:

electronically transmitting, by the transmitting device of the processing server, the received transaction message to a second financial institution associated with a transaction account corresponding to the primary account number via the payment network; and receiving, by the receiving device of the processing server, the response transaction message from the second financial institution via the payment network, wherein the response transaction message includes a fourth data element configured to store a response code indicative of approval or denial of a related payment transaction.

16. The system of claim 15, wherein the received transaction message includes a message type indicator indicative of an authorization request, and the response transaction message includes a message type indicator indicative of an authorization response.

17. The system of claim 15, wherein the received transaction message further includes a fifth data element configured to store an issuer identifier associated with the second financial institution.

18. The system of claim 11, wherein the one or more standards includes the ISO 8583 standard.

19. The system of claim 11, wherein each account profile further includes electronic ticketing data associated with a ticket for an event, the event being associated with an event merchant identifier included in the predetermined set of merchant identifiers associated with the group of related merchants and separate from the transacting merchant identifier, the first authentication merchant identifier, and the second authentication merchant identifier.

20. The system of claim 11, wherein each account profile further includes a device identifier associated with a mobile communication device having an electronic wallet application program installed therein that includes data associated with at least one of the one or more transaction account numbers included in the respective account profile.

* * * * *